(12) United States Patent
Bullivant et al.

(10) Patent No.: US 8,496,015 B2
(45) Date of Patent: Jul. 30, 2013

(54) EXPEDITIONARY VEHICLE WASH SYSTEM

(75) Inventors: Todd J. Bullivant, Rumson, NJ (US); Matthew R. Drozdowicz, Beachwood, NJ (US); Rand K. Drozdowicz, Beachwood, NJ (US)

(73) Assignee: Milspray, LLC, Lakewood, NJ (US)

( * ) Notice: Subject to any disclaimer, the term of this patent is extended or adjusted under 35 U.S.C. 154(b) by 227 days.

(21) Appl. No.: 12/925,626

(22) Filed: Oct. 26, 2010

(65) Prior Publication Data
US 2012/0097197 A1    Apr. 26, 2012

(51) Int. Cl.
*B08B 3/00* (2006.01)

(52) U.S. Cl.
USPC ............................................. 134/123

(58) Field of Classification Search
USPC ............................................. 134/123
See application file for complete search history.

(56) References Cited

U.S. PATENT DOCUMENTS

| | | | | |
|---|---|---|---|---|
| 3,258,019 A | * | 6/1966 | Bellas et al. | 134/99.2 |
| 5,011,609 A | * | 4/1991 | Fink | 210/665 |
| 5,029,758 A | * | 7/1991 | Chayer | 239/172 |
| 5,597,001 A | * | 1/1997 | Rasmussen et al. | 134/104.2 |
| 6,021,792 A | * | 2/2000 | Petter et al. | 134/111 |
| 6,464,063 B2 | * | 10/2002 | Colicchio | 194/242 |
| 2003/0019509 A1 | * | 1/2003 | Locascio et al. | 134/10 |
| 2009/0065442 A1 | * | 3/2009 | Taylor et al. | 210/723 |

\* cited by examiner

*Primary Examiner* — Michael Kornakov
*Assistant Examiner* — David Cormier
(74) *Attorney, Agent, or Firm* — Robert M. Skolnik

(57) ABSTRACT

A standard military transportation container is positioned next to a waste water containment pad. Several connections are provided for on the side of container. One of these connectors is a fluid connection for containment pad relocatable waste water sump pump. Another of the connectors provides a power outlet for the system to be connected to an external source of electrical power. A third connector connects a pressure washer to the wash system. A vacuum cleaner connection, is provided on an opposite side of the container so that equipment may be vacuumed and washed simultaneously on opposite sides of the wash system. All connectors are flush mounted into the walls of container thus eliminating any protrusions which could otherwise interfere with container loading resulting in connector breakage and extra difficulties in container handling. A pressure washer, vacuum cleaner, pumps and electrical controls are located in the container. Several filter stages are provided in the container to enable re-use of wash water collected in the containment pad.

5 Claims, 4 Drawing Sheets

EXPEDITIONARY VEHICLE WASH SYSTEM

FIELD OF THE INVENTION

The present invention is a portable wash system for facilitating, at field locations, the washing of military vehicles and equipment in nearly any environment.

SUMMARY OF THE INVENTION

The system of the present invention is specifically designed to meet the needs of military use. It is easy to use and maintain and is portable. The system is contained within rugged existing military containers that afford seamless transition into military embarkation for deployment. The system meets stringent environmental regulations.

The present invention recognizes that military equipment is exposed to many environmental factors that, over time, adversely affect the serviceability and life cycle of the equipment. A principal step in the protection of the equipment against these environmental factors is the ability to regularly wash and maintain the equipment. It is also recognized that access to an in-ground wash system is not typically available.

The wash system is housed in a standard military shipping container. Necessary container modifications to connect the wash system for use are made in such a way as not to alter the container's outside envelope, thus enabling normal transport of the container without damage to the modifications.

DETAILED DESCRIPTION OF THE PREFERRED EMBODIMENT

Figure 1:
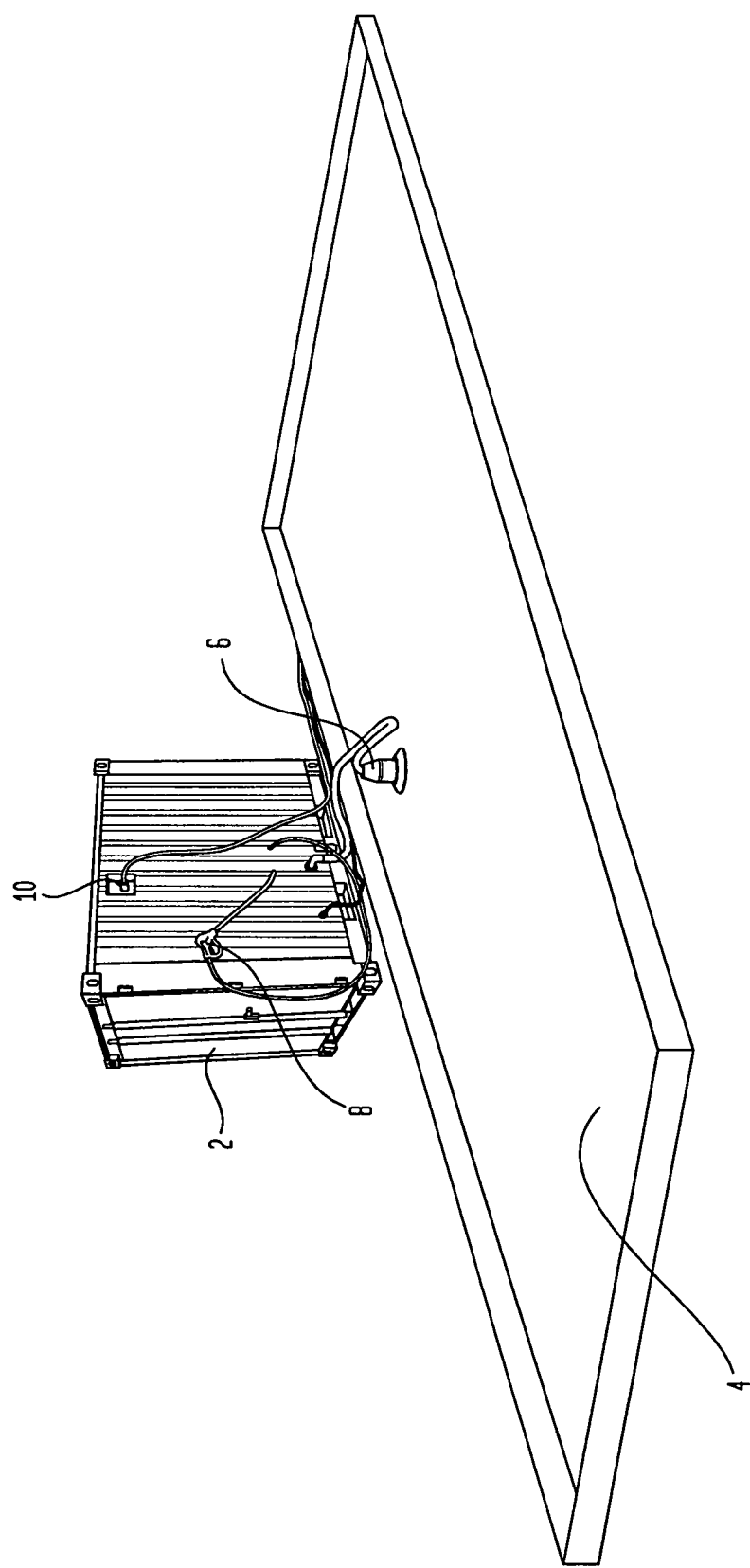
FIG. 1 is a perspective view of the exterior of the military container housing the wash system and the wash water containment pad.

As shown in FIG. 1, a standard military transportation container 2 (known as an ACA QUADCON) is positioned next to a waste water containment pad 4. Several connections are provided for on the side of container 2. One of these connectors is a fluid connection for containment pad relocatable waste water sump pump 6. Another of the connectors, 10, provides a power outlet for the system to enable it to be connected to an external source of electrical power. A third connector connects pressure washer 8 to the wash system. A vacuum cleaner connection, not shown is provided on the opposite side of container 2 so that equipment may be vacuumed and washed simultaneously on opposite sides of the wash system. All connectors are flush mounted into the walls of container 2 thus eliminating any protrusions which could otherwise interfere with container loading resulting in connector breakage and extra difficulties in container handling.

Figure 2:
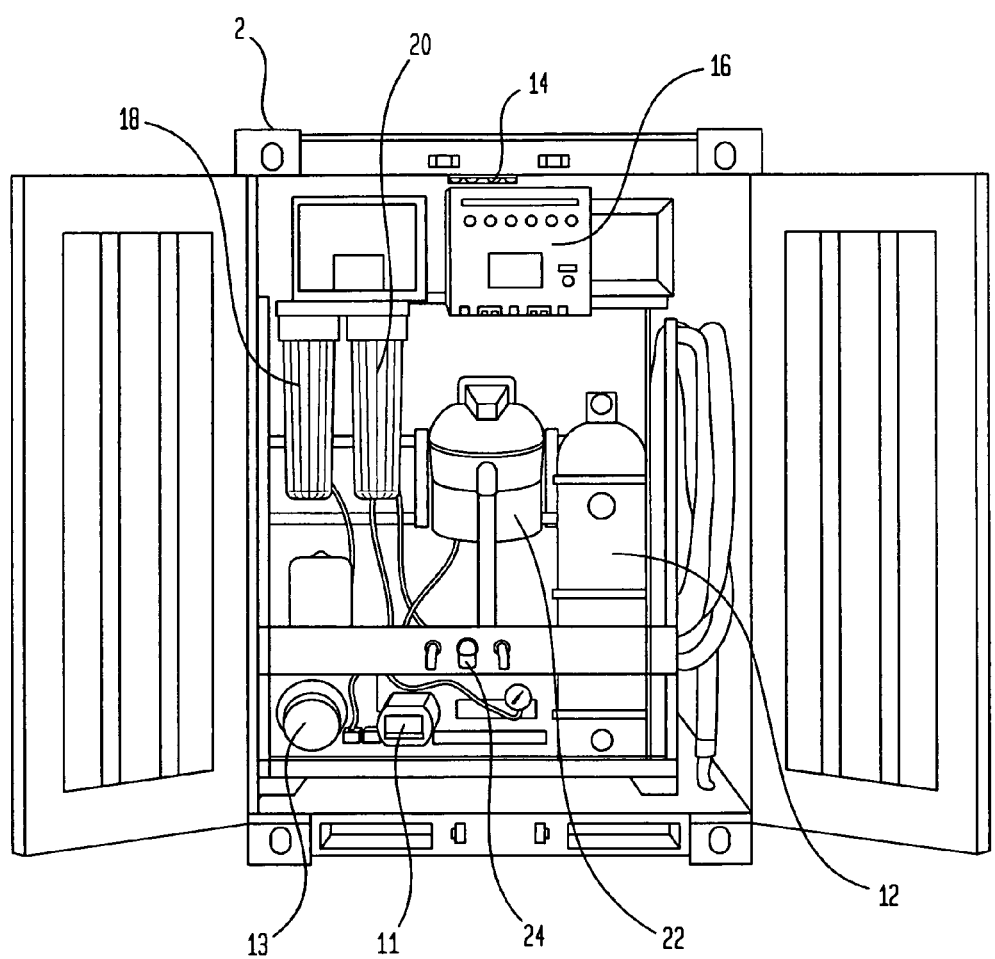
FIG. 2 is a front view of the system components.

FIG. 2 is a front view of the wash system mounted in the container 2. Wash water is re-used by subjecting it to several filtering stages. The wash water is first filtered by a three stage bag filter 9 (shown in FIG. 4). Then, the output of the bag filters 9 is coupled to filter stage 12, a large washable cartridge filter. The water is then further filtered in fine particle removal filters 18 and 20.

The vacuum cleaner 22 is positioned for convenient cleaning. Interior lighting 14 is provided as required. The electrical control panel 16 controls the wash system operation. Drainage of the system is accomplished by purge valves 24.

Figure 3:
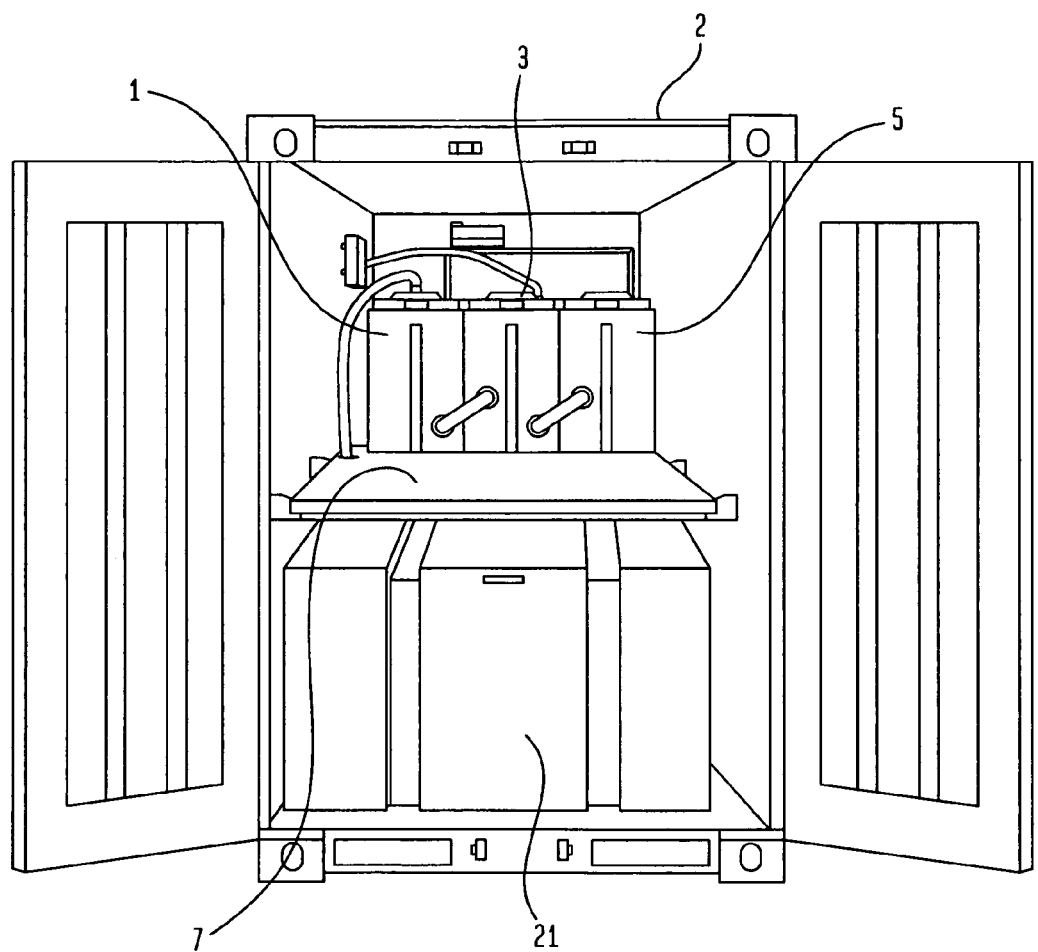
FIG. 3 is a rear view of the system components.

FIG. 3 is a rear view of the system components in container 2. Numeral 21 shows the clean water holding tank. The additional filter tanks are provided for removal of impurities filtered from the wash water. These are heavy sediment removal filter tank 1, oil and light solids removal filter tank 3, and oil removal tank 5. A containment pad storage shelf 7 is also provided.

Figure 4:
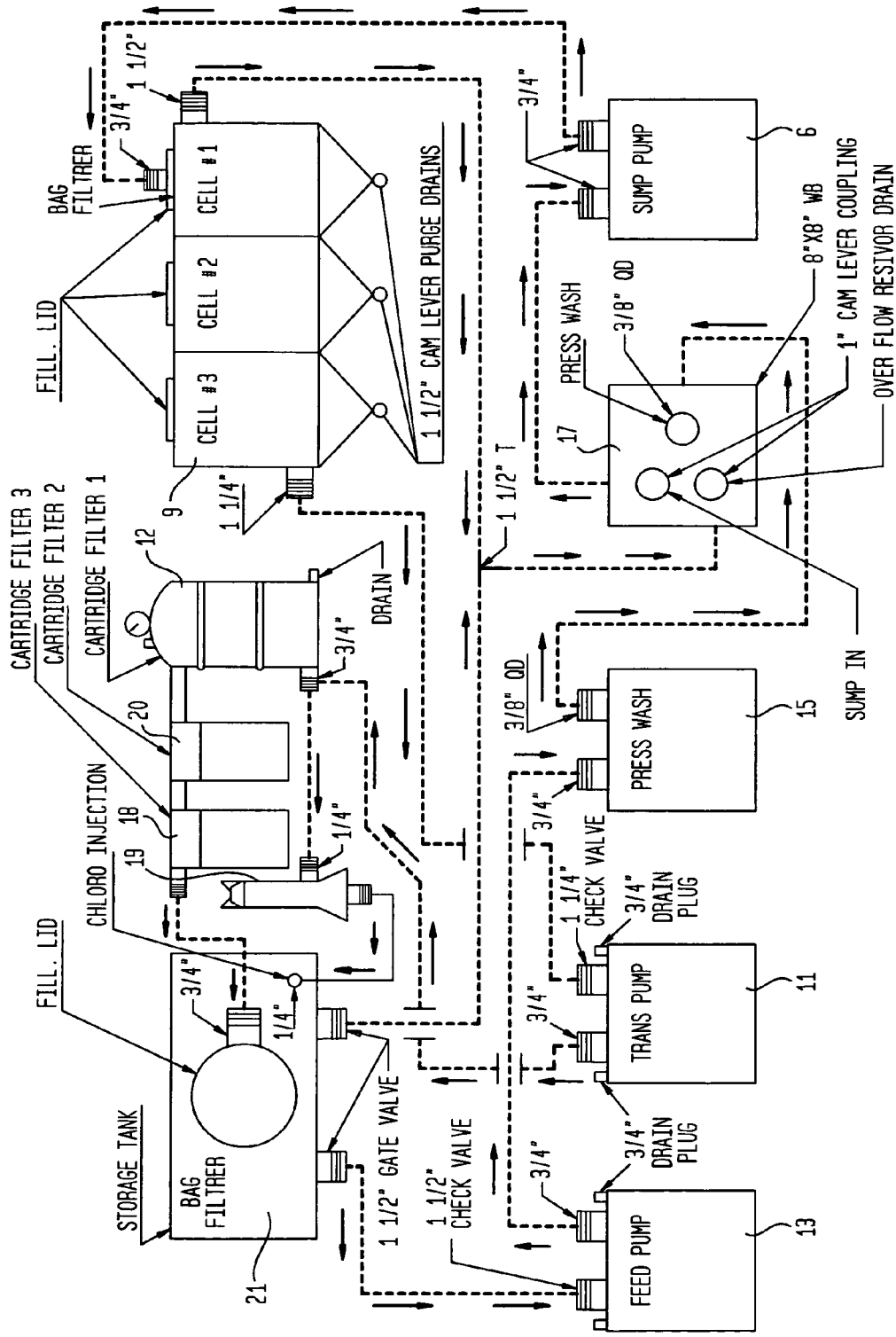
FIG. 4 is a block diagram of the fluid connections in the wash system.

FIG. 4 is a block diagram showing the fluid connections of certain components of the wash system. As shown in FIG. 4, the fluid inputs to the clean water holding tank 21 are clean water and the filtered output of sump pump 6 from the waste water containment pad. The output of three stage bag filters 9 is connected via a transfer pump 11 to the first of the three stage filter system consisting of the filters 12, 20 and 18. The output of the filters is collected in the main storage tank 21. A chlorinator 19 takes water from an output of filter 12 and provides chlorinated water into to the storage tank 21. The output of the storage tank 21 is connected to a feed pump 13 which delivers pressurized water to pressure washer 15, 17. Other outputs from storage tank 21 and clean water tank 9 are connected directly to the pressure washer 17.

Feed pump 13 (FIGS. 2 and 4) takes water from the main storage tank 21 and supplies it to pressure washer 15. Feed pump 13 cycles ON and OFF maintaining a constant feed of water to the pressure washer. A feed pump pressure gage (not shown) monitors feed pump pressure. If the pressure drops below a predetermined minimum pressure, the system automatically shuts down power to the pressure washer. This safety prevents a run-dry situation and resultant damage to the washer's motor.

Transfer pump 11 (FIGS. 2 and 4) is activated by a float level switch in the third filter cell 18 to transfer water through the filters and into the storage tank 21 for reutilization. The transfer pump 11 shuts OFF when the water level drops below required level.

The pressure washer water it supplied by the feed pump 11. The pressure washer outlet is a quick disconnect located on the outside of container 2. The hose and wash wand attach to this outlet.

The sump pump 6 is moveable to any location in the containment pad so that it can collect waste water wherever it gathers. The waste water is coupled to the first of the three bag filters 9.

The chlorinator 19 contains chlorine tablets. It is connected to the main tank 21. When the transfer pump 11 is activated, un-chlorinated water is fed into the chlorinator from the filter stage 12. The chlorine treated water is supplied to the main tank 21.

Commercially available major components of the system are set forth below: containment pad, Ultimate Washer, Inc. 711 Commerce Way E, Unit 1 Jupiter, Fla.; pressure washer, 2000 PSI, Northern Tool and Equipment Catalog Company; wash rack, Hydro Tek, Redlands, Calif.

Further modifications to the methods and apparatus of the invention may be made without departing from the spirit and scope of the invention.

We claim:
1. An expeditionary military equipment wash system comprising: an enclosure, connections for electrical power, vacuum cleaner, power washer and sump pump flush mounted into the exterior of said enclosure to eliminate any protrusions; a wash water containment pad located in proximity to said enclosure; a sump pump moveably located in said wash water containment pad for reusing wash water; a wash water storage tank mounted in said enclosure; a plural- ity of fluid filters mounted in said enclosure and connected between said storage tank and said sump pump for removing impurities from said wash water before being returned to said storage tank, a vacuum cleaner mounted in said housing; and a power washer mounted in said housing.

2. The wash system of claim 1 wherein said vacuum cleaner connection is located on one side of said enclosure and said power washer and sump pump connections are located on another side of said enclosure to enable the simultaneous washing and vacuum cleaning of military equipment.

3. The wash system of claim 2 further including a shelf mounted in said enclosure for storing said wash water containment pad when not in use.

4. The wash system of claim 1 wherein said moveable sump pump may be located anywhere within said wash water containment pad so that said pad may be used on irregular ground surfaces.

5. An expeditionary military equipment wash system comprising: an enclosure, connections flush mounted into the exterior of said enclosure to eliminate any protrusions enabling connection of electrical power, a vacuum cleaner hose, a power washer wand and a sump pump input; a wash water containment pad located in proximity to said enclosure; a sump pump moveably located in said wash water containment pad for collection used wash water for reuse; a wash water storage tank mounted in said enclosure; and a plurality of fluid filters mounted in said enclosure and connected between said storage tank and said sump pump for removing impurities from said wash water before it is returned to said storage tank for reuse.

\* \* \* \* \*